United States Patent
Schurr

(10) Patent No.: US 6,619,522 B2
(45) Date of Patent: Sep. 16, 2003

(54) MOTORCYCLE GOLF BAG CARRIER

(76) Inventor: Robert A. Schurr, 6996 Mill Rd., Brecksville, OH (US) 44141-1812

( * ) Notice: Subject to any disclaimer, the term of this patent is extended or adjusted under 35 U.S.C. 154(b) by 138 days.

(21) Appl. No.: 09/963,985

(22) Filed: Sep. 26, 2001

(65) Prior Publication Data

US 2003/0057242 A1 Mar. 27, 2003

(51) Int. Cl.$^7$ ................................................. B62J 7/00
(52) U.S. Cl. ........................ 224/413; 224/430; 224/454; 224/460
(58) Field of Search ................................ 224/413, 422, 224/429, 430, 431, 433, 438, 452–454, 459–460, 42.11, 274; 206/315.3

(56) References Cited

U.S. PATENT DOCUMENTS

| | | | |
|---|---|---|---|
| 1,475,605 A | | 11/1923 | Smith |
| 1,628,771 A | * | 5/1927 | Frisk ........................ 206/315.3 |
| 1,683,169 A | | 9/1928 | De Noya |
| 2,908,510 A | | 10/1959 | Lossau |
| 3,227,236 A | * | 1/1966 | Burton ........................ 224/413 |
| 3,286,891 A | | 11/1966 | Jones, Jr. |
| 3,795,354 A | * | 3/1974 | Stippich ........................ 224/430 |
| 3,938,719 A | | 2/1976 | Carlton |
| 4,387,836 A | * | 6/1983 | Laesch ........................ 224/454 |
| 4,393,986 A | | 7/1983 | Sirey |
| 4,533,013 A | * | 8/1985 | Hightower ........................ 224/274 |
| 5,207,361 A | | 5/1993 | Slifka |
| 5,340,003 A | | 8/1994 | Wilson |
| 5,664,715 A | | 9/1997 | Gogan et al. |
| 5,725,138 A | | 3/1998 | Zagrodnik |
| D439,215 S | * | 3/2001 | Kahmann ........................ D12/407 |
| 6,234,266 B1 | * | 5/2001 | Saiki ........................ 224/413 |
| 6,401,998 B1 | * | 6/2002 | Puluso ........................ 224/413 |

* cited by examiner

Primary Examiner—Nathan J. Newhouse
(74) Attorney, Agent, or Firm—Rankin, Hill, Porter & Clark LLP

(57) ABSTRACT

A motorcycle golf bag carrier is used with a saddlebag mounting system in which a pair of frame-mounted brackets each having an opening are spaced from each other longitudinally of the motorcycle at approximately the same vertical elevation. A locking pin extends through the opening in each bracket, and an elongate, longitudinally extending, frame-mounted rail is disposed at a vertical elevation lower than the brackets. The carrier according to the invention includes a generally L-shaped bracket having a first, laterally extending section and a second, vertically extending section. The first section includes a longitudinally extending channel of a size and shape that approximates the size and shape of the longitudinally extending rail and which permits the bracket to be mounted to the rail. The second section has a pair of spaced openings of a size and shape to receive the pins, the openings being aligned with the openings in the brackets when the channel is mounted to the rail. A first, elongate retainer member is connected to one side of the second section and encircles a golf bag disposed on the first section. Preferably, the first section has a vertically extending lip extending about its periphery within which the bottom of the golf bag can be nested, and the first retainer member is a bungee cord or a strap having connectors at its ends. The second section can include an upper portion that extends to a vertical elevation above the seat of the motorcycle and a second, elongate retainer member that is connected to one side of the upper portion and encircles the golf bag. Alternative embodiments include specially configured golf bags and a golf bag travel case that can be connected to and carried by the motorcycle.

15 Claims, 6 Drawing Sheets

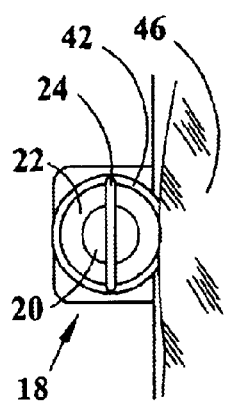
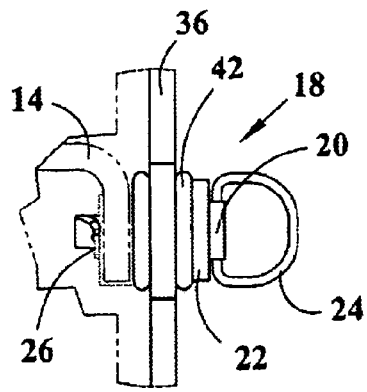
FIG. 3   FIG. 4
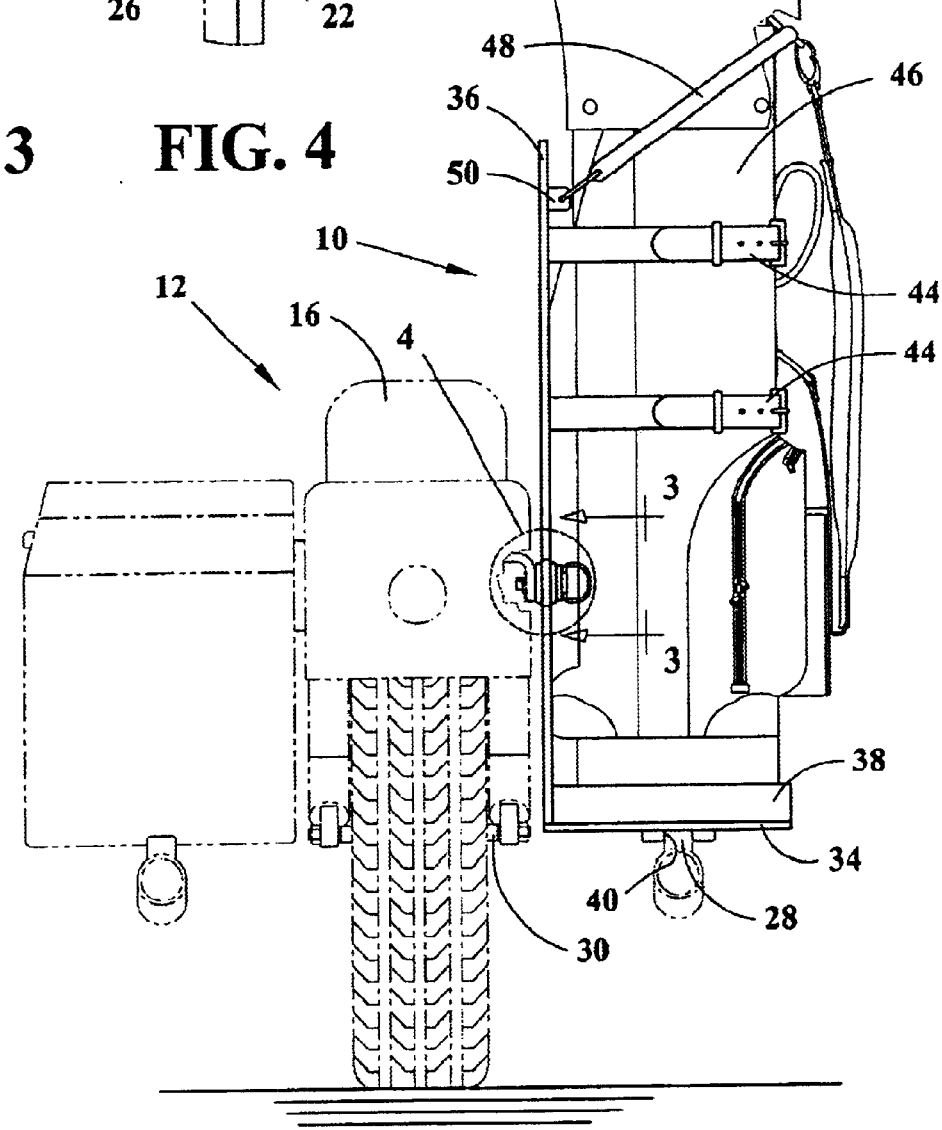
FIG. 2

MOTORCYCLE GOLF BAG CARRIER

BACKGROUND OF THE INVENTION

1. Field of the Invention

The invention relates to carriers for golf bags and, more particularly, to a golf bag carrier especially adapted for use with motorcycles.

2. Description of the Prior Art

In recent years, the popularity of both motorcycles and golf has increased greatly. Unfortunately, because it is very difficult and possibly unsafe for a motorcycle rider to carry golf clubs while riding a motorcycle, the use of motorcycles as a way for golfers to travel to and from golf courses has been very limited.

Although golf bag carriers have been provided for motorcycles, as exemplified by U.S. Pat. No. 2,908,510, U.S. Pat. No. 3,286,891, U.S. Pat. No. 3,938,719, and U.S. Pat. No. 5,207,361, these carriers are not suitable for use with certain motorcycles. Specifically, certain Harley-Davidson motorcycles have a saddlebag mounting system that employs (a) a pair of frame-mounted brackets having an opening, the brackets being longitudinally spaced from each other at approximately the same vertical elevation, (b) a locking pin that extends through the opening in each bracket, and (c) an elongate, longitudinally extending, frame-mounted rail disposed at a vertical elevation lower than the brackets. This mounting system will be referred to herein as "the Harley-Davidson mounting system." A saddlebag adapted for use with the Harley-Davidson mounting system includes (a) a bottom wall that has a longitudinally extending channel of approximately the same size and shape as the rail and which is adapted to fit onto the rail and (b) a sidewall that has a pair of spaced openings that are aligned with the openings in the brackets when the saddlebag is mounted on the rail.

In use, the locking pins are inserted though the aligned openings in the saddlebag and the brackets. The pins then are locked in place to secure the saddlebag to the motorcycle. Because the bottom wall rests on the rail, most of the weight of the saddlebag is carried by the rail. Because the locking pins are accessible only from the interior of the saddlebag, the system is tamper-proof (if the saddlebag has a locking lid).

Desirably, a golf bag carrier would be available that would enable golf bags to be carried by motorcycles employing the Harley-Davidson mounting system. It also would be desirable for golf bags to be usable with the Harley-Davidson mounting system without the need for a separate carrier.

SUMMARY OF THE INVENTION

In response to the foregoing concerns, the present invention provides a new and improved motorcycle golf bag carrier. The invention is especially effective with the Harley-Davidson mounting system. In such a system, a pair of frame-mounted brackets each having an opening are longitudinally spaced from each other at approximately the same vertical elevation. A locking pin extends through the opening in each bracket, and an elongate, longitudinally extending, frame-mounted rail is disposed at a vertical elevation lower than the brackets.

The carrier according to the invention includes a generally L-shaped bracket having a first, laterally extending section and a second, vertically extending section. The first section includes a longitudinally extending channel of a size and shape that approximates the size and shape of the longitudinally extending rail and which permits the first section to be mounted to the rail. The second section has a pair of spaced openings of a size and shape to receive the pins, the openings being aligned with the openings in the frame-mounted brackets when the channel is mounted to the rail. A first, elongate retainer member is connected to one side of the second section and encircles a golf bag disposed on the first section.

In the preferred embodiment, the first section has a vertically extending lip extending about its periphery within which the bottom of the golf bag can be nested. Preferably, the first retainer member is a bungee cord or a strap having connectors at its ends. If desired, the second section can include an upper portion that extends to a vertical elevation above the seat of the motorcycle. If the upper portion is employed, a second, elongate retainer member is connected to one side of the upper portion and encircles the golf bag. Another technique for connecting the golf bag to the carrier is to connect a pair of hinged arms to the second section. The arms can be pivoted to extend on either side of the golf bag, and an elongate retainer member can be connected to the arms so as to encircle the golf bag.

If the use of an L-shaped bracket is not desired, the bottom wall of a golf bag can be provided with a longitudinally extending channel of a size and shape that approximates the size and shape of the longitudinally extending rail and which permits the bottom wall to be mounted to the rail. In this embodiment, a plate member is connected to the brackets, the plate member extending above the level of the motorcycle seat and having a pair of spaced openings of a size and shape to receive the pins. Also, an elongate retainer member is connected to one side of the plate member and encircles a golf bag whose channel is disposed on the rail.

Yet an additional embodiment of the invention employs a golf bag having a bottom wall with a longitudinally extending channel of a size and shape that approximates the size and shape of the longitudinally extending rail and which permits the bottom wall to be mounted to the rail. In this embodiment, the golf bag includes a side wall having a plate member included as a part thereof. The plate member has a pair of spaced openings of a size and shape to receive the pins, the openings being aligned with the openings in the brackets when the channel is mounted to the rail.

A further embodiment of the invention employs a golf bag travel case having a bottom wall with a longitudinally extending channel of a size and shape that approximates the size and shape of the longitudinally extending rail and which permits the bottom wall to be mounted to the rail. In this embodiment, the travel case has a side wall with a pair of spaced openings of a size and shape to receive the pins, the openings being aligned with the openings in the brackets when the channel is mounted to the rail. Preferably, the golf bag travel case is made of a rigid material such as aluminum, fiberglass or ABS.

The foregoing features and advantages of the invention will be apparent from a review of the accompanying specification, claims, and drawings.

BRIEF DESCRIPTION OF THE DRAWINGS

FIG. 2 is a rear elevation view of the golf bag carrier according to the invention taken along a plane indicated by line 2—2 in FIG. 1;

FIG. 3 is an enlarged view of a portion of a frame-mounted bracket and locking pin used with the invention taken along a plane indicated by line 3—3 in FIG. 2;

FIG. 4 is an enlarged view of the bracket and locking pin of FIG. 2;

DESCRIPTION OF THE PREFERRED EMBODIMENT

Figure 1:
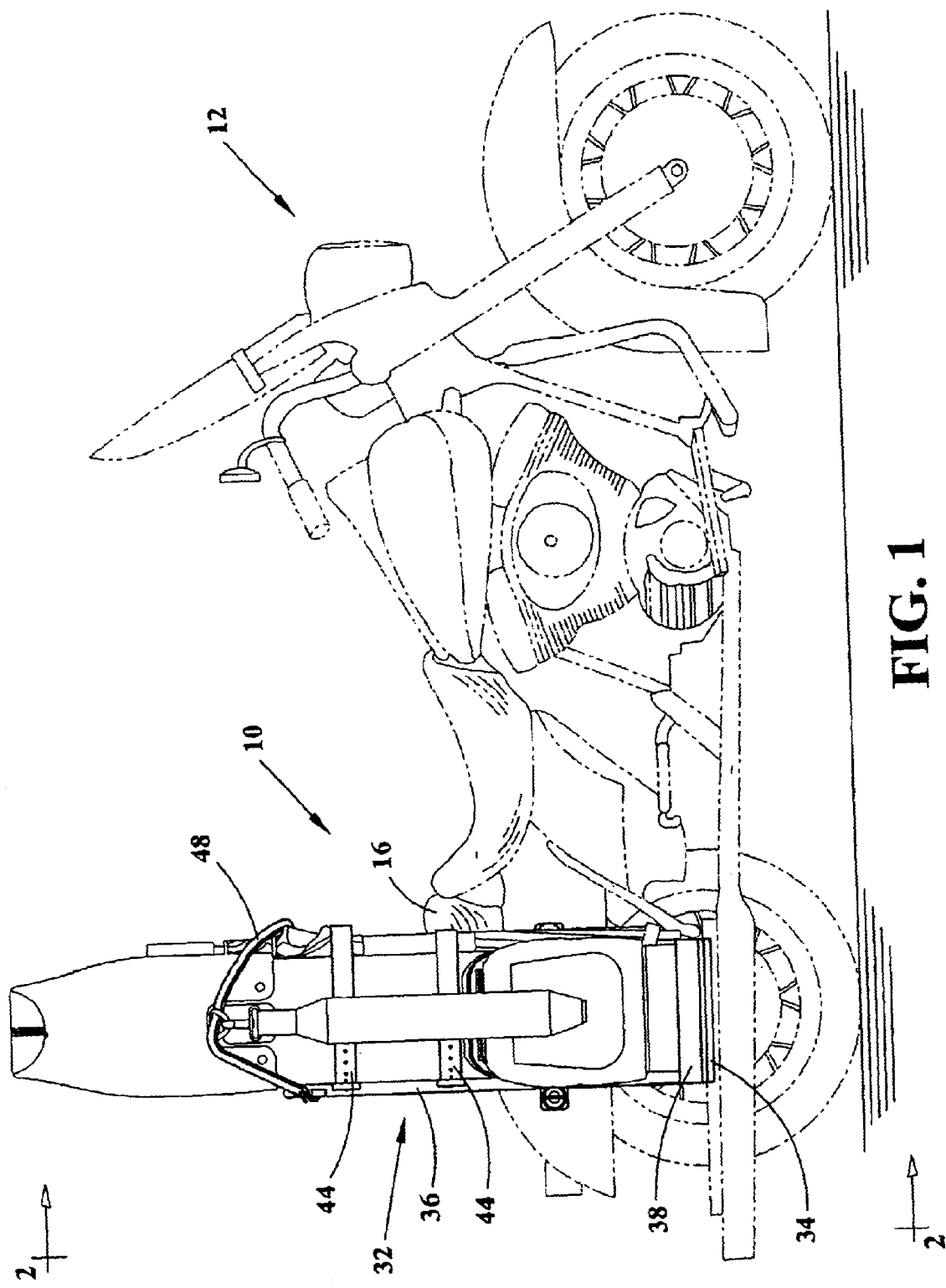
FIG. 1 is a side elevation view of a golf bag carrier according to the invention showing a golf bag being carried by a motorcycle.
Figures 5, 6:
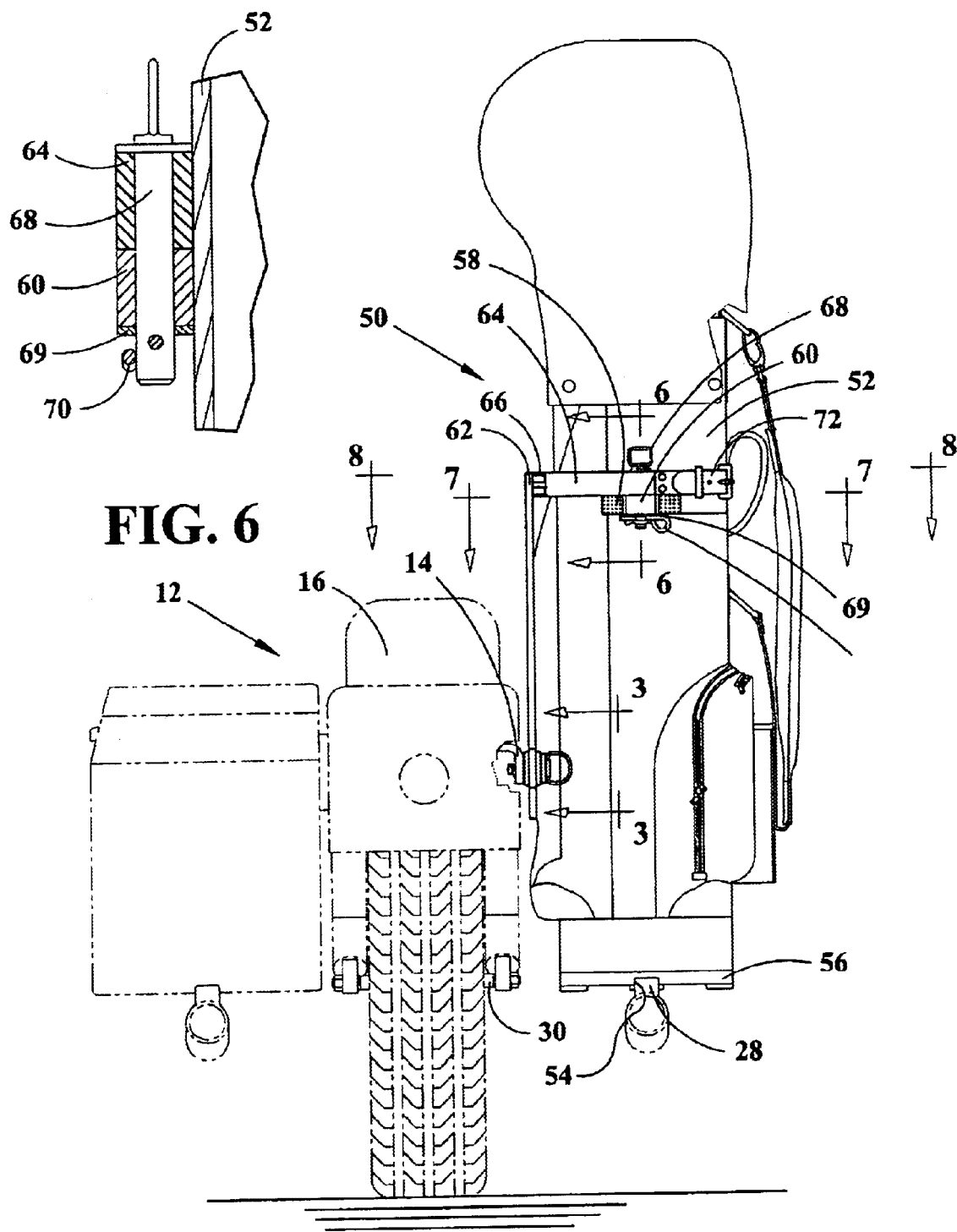
FIG. 5 is a view similar to FIG. 2 showing an alternative embodiment of the invention in which a specially configured golf bag is carried by a motorcycle.
FIG. 6 is an enlarged cross-sectional view of a portion of the embodiment of FIG. 5 taken along a plane indicated by line 6—6 in FIG. 5.
Figure 8:
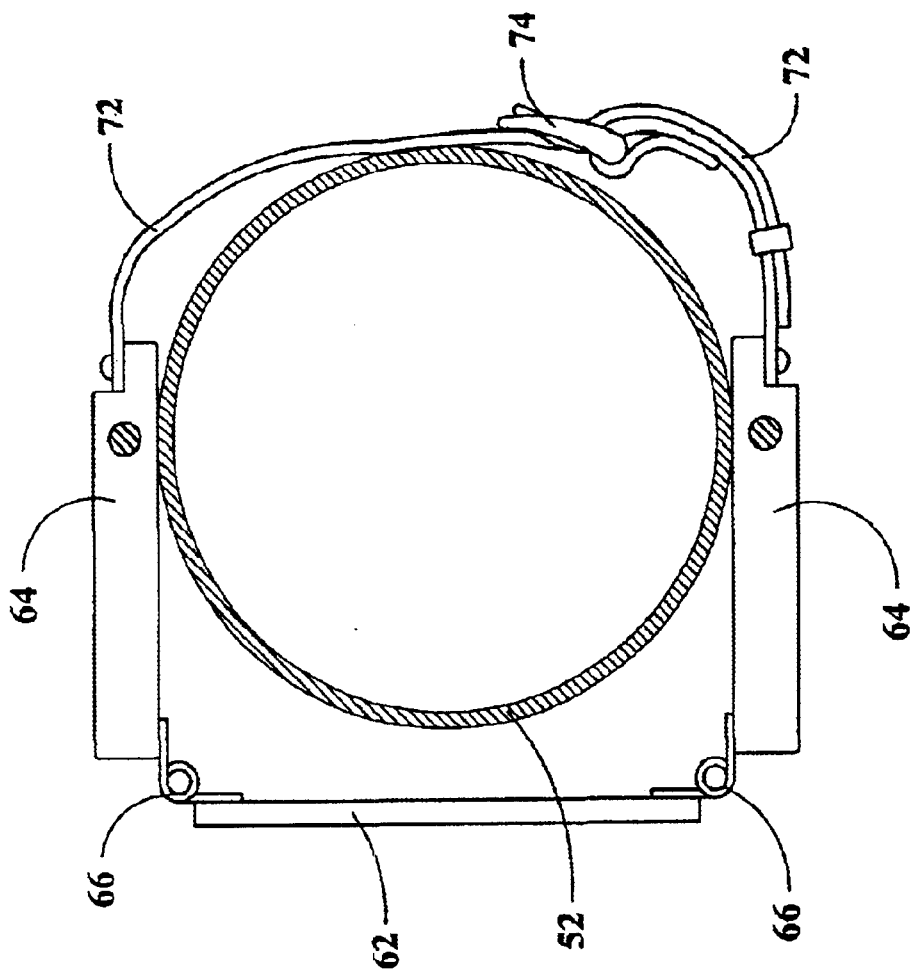
FIG. 8 is a cross-sectional view of a portion of the embodiment of FIG. 5 taken along a plane indicated by line 8—8 in FIG. 5.
Figure 7:
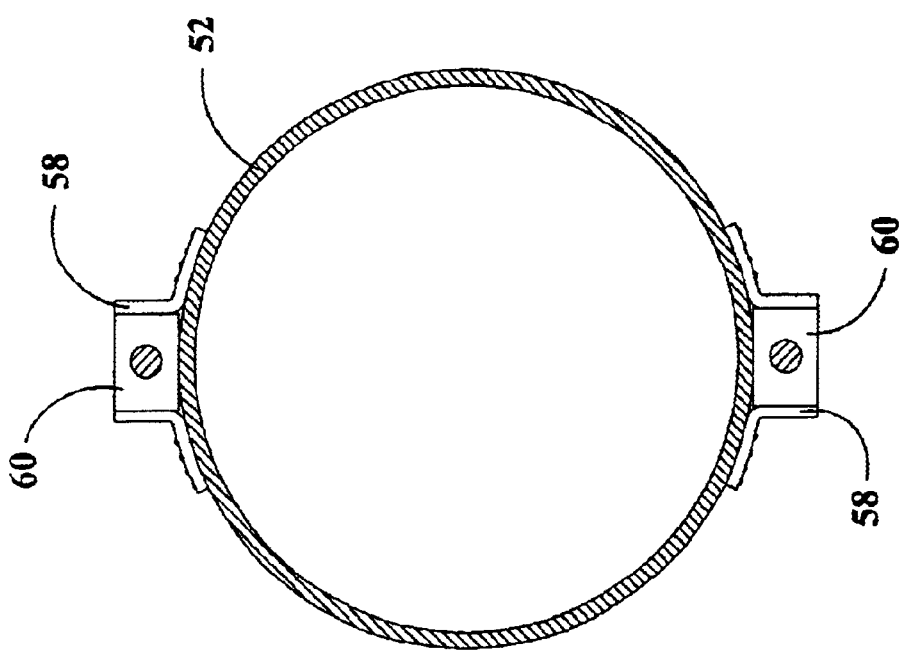
FIG. 7 is a cross-sectional view of a portion of the embodiment of FIG. 5 taken along a plane indicated by line 7—7 in FIG. 5.

Referring to FIGS. 1 and 2, a motorcycle golf bag carrier according to the invention is indicated generally by the reference numeral 10. The carrier 10 is attached to a motorcycle indicated schematically by the reference numeral 12. The motorcycle 12 has a so-called Harley-Davidson saddle-bag mounting system in which a pair of frame-mounted brackets 14 each having an opening (not shown) are longitudinally spaced from each other at approximately the same vertical elevation. The brackets 14 are located below the upper surface of a rear seat 16. A locking pin 18 extends through the opening in each bracket 14. As best shown in FIGS. 3 and 4, the pin 18 has an elongate shank 20, a disk-like shoulder 22, a semi-circular handle 24, and lugs 26 at the end of the shank 20 opposite the handle 24. The lugs 26 extend radially outwardly from the shank 20 180 degrees from each other. The lugs 26 are adapted to ride up and down ramps or slots included as part of the bracket 14. An elongate, longitudinally extending, frame-mounted tubular rail 28 is disposed at a vertical elevation lower than the brackets 14, and somewhat lower than the rear axle 30.

The carrier 10 includes a generally L-shaped bracket 32 having a first, laterally extending section 34 and a second, vertically extending section 36. An upstanding lip 38 extends about the periphery of the first section 34. A pair of spaced bars define a channel 40 that is approximately of the same size and shape as the rail 28. The second section 36 includes a pair of spaced openings that are aligned with the openings in the frame-mounted brackets 14 when the channel 40 is mounted atop the rail 28. As can be seen in FIGS. 3 and 4, an elastomeric grommet 42 is fitted to each of the openings in the second section 36. A pair of elongate restraining members in the form of straps 44 are connected to opposite sides of the second section 36 and are adapted to encircle a conventional golf bag 46 that is being carried by the carrier 10. A third elongate restraining member 48 is connected to tabs 50 included as part of the second section 36 and also is adapted to encircle the golf bag 46 near the upper end thereof.

In order to lock the carrier to the motorcycle 12, the channel 40 is mounted atop the rail 28, and the openings in the frame-mounted-brackets 14 and the openings in the second section 36 are aligned. Thereafter, the shanks 20 of the pins 18 are inserted through the aligned openings and the handle 24 is rotated so that the lugs 26 are moved up the ramps or slots included as part of the brackets 14. Eventually, a detent (not shown) is reached that will retain the lugs 26 and prevent further rotation of the pins 18. The interaction of the ramps/slots and the lugs 26 causes the brackets 14, 32 to be connected tightly together. Because the first section 34 rests atop the rail 28, most of the weight of the carrier 10 and the golf bag 46 is supported by the rail 28.

Referring now to FIGS. 5–8, an alternative embodiment of the invention is indicated by the reference numeral 50. In the embodiment 50, a golf bag 52 is similar to the golf bag 46, except that a channel 54 is formed in the bottom wall 56 of the bag 52. The channel 54 is the same size and shape as the channel 40. A pair of brackets 58 extend from opposite sides of the bag 52 near the upper end thereof. The brackets 58 are secured to the bag 52 by rivets or similar fasteners. The brackets 52 provide support for sleeves 60.

The embodiment 50 includes a vertically extending plate 62. The lower portion of the plate 62 is connected to the frame-mounted brackets 14 in the same manner as the second section 36. A pair of arms 64 are connected to the upper end of the plate 62 by hinges 66. The ends of the arms 64 include vertically oriented openings through which pins 68 can be fitted. The pins 68 extend through the sleeves 60 and are secured in place by hitch pins 70. The ends of the arms 64 carry straps 72 that can be secured to each other by a buckle 74. Although the brackets 58 and the pins 68 should be adequate to retain the bag 52 in place, the use of the straps 72 provides a backup in the event the brackets 58 or pins 68 should fail.

Figure 10:
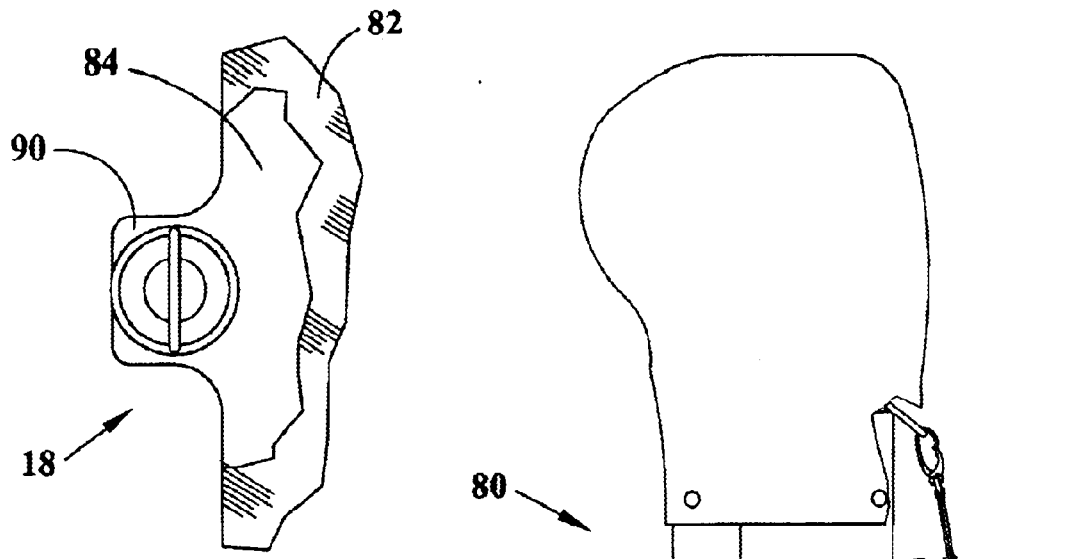
FIG. 10 is an enlarged view of a portion of the embodiment of FIG. 9 taken along a plane indicated by line 10—10 in FIG. 9.
Figure 9:
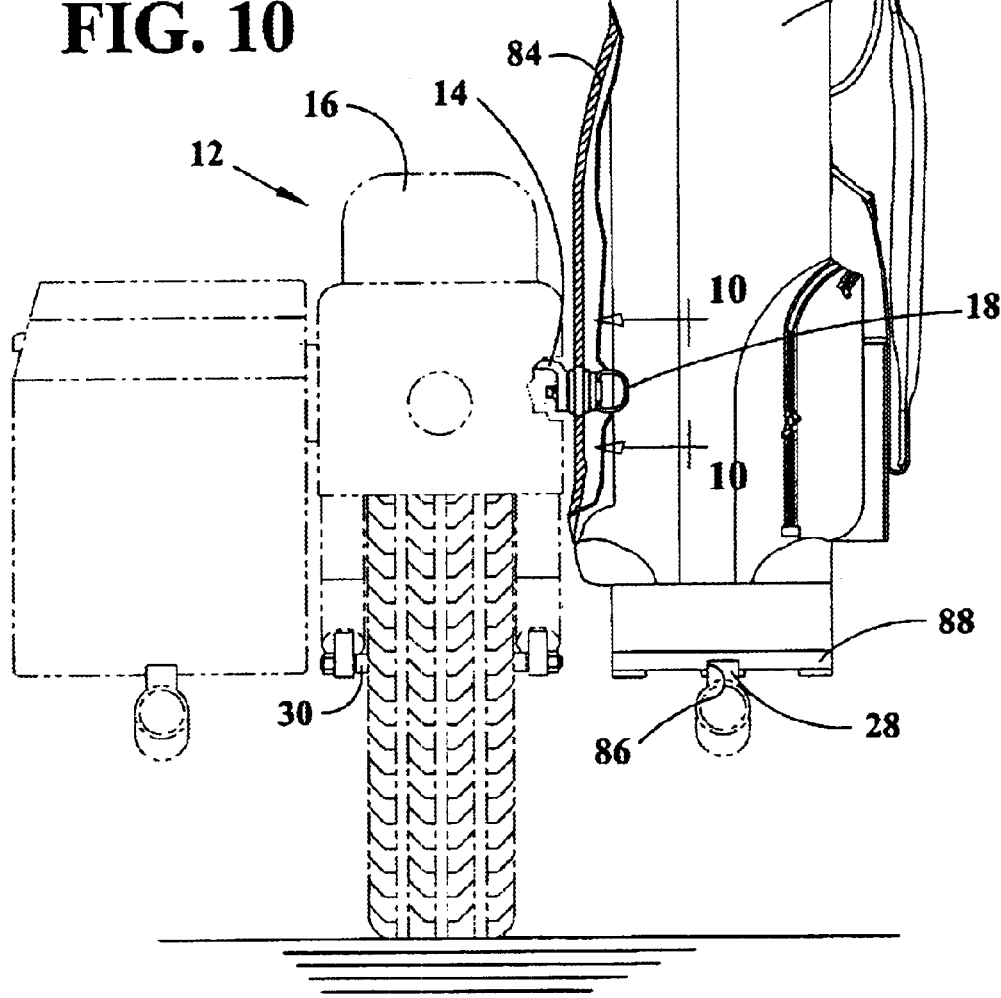
FIG. 9 is a view similar to FIG. 2 showing an alternative embodiment of the invention in which a specially configured golf bag is carried by a motorcycle.

Referring now to FIGS. 9 and 10, another alternative embodiment of the invention is indicated by the reference numeral 80. In the embodiment 80, a golf bag 82 is similar to the golf bag 52, except that a narrow, elongate plate 84 is included as part of the side wall of the bag 82. The plate 84 is attached to the bag 82 at locations near the top and bottom of the bag 82. As with the bag 52, a channel 86 is formed in the bottom wall 88 of the bag 82. The channel 86 is approximately the same size and shape as the rail 28 and is intended to be mounted thereon. As best seen in FIG. 10, the plate 84 includes a pair of laterally extending tabs 90 that have openings formed therein. Locking pins 18 are inserted through the aligned openings in the brackets 14 and the tabs 90 so as to connect the plate 84 to the brackets 14 and thereby secure the bag 82 to the motorcycle 12.

Figure 12:
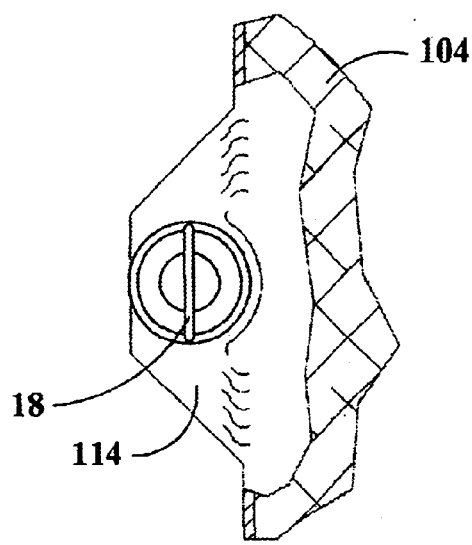
FIG. 12 is an enlarged view of a portion of the embodiment of FIG. 11 taken along a plane indicated by line 12—12 in FIG. 11.
Figure 11:
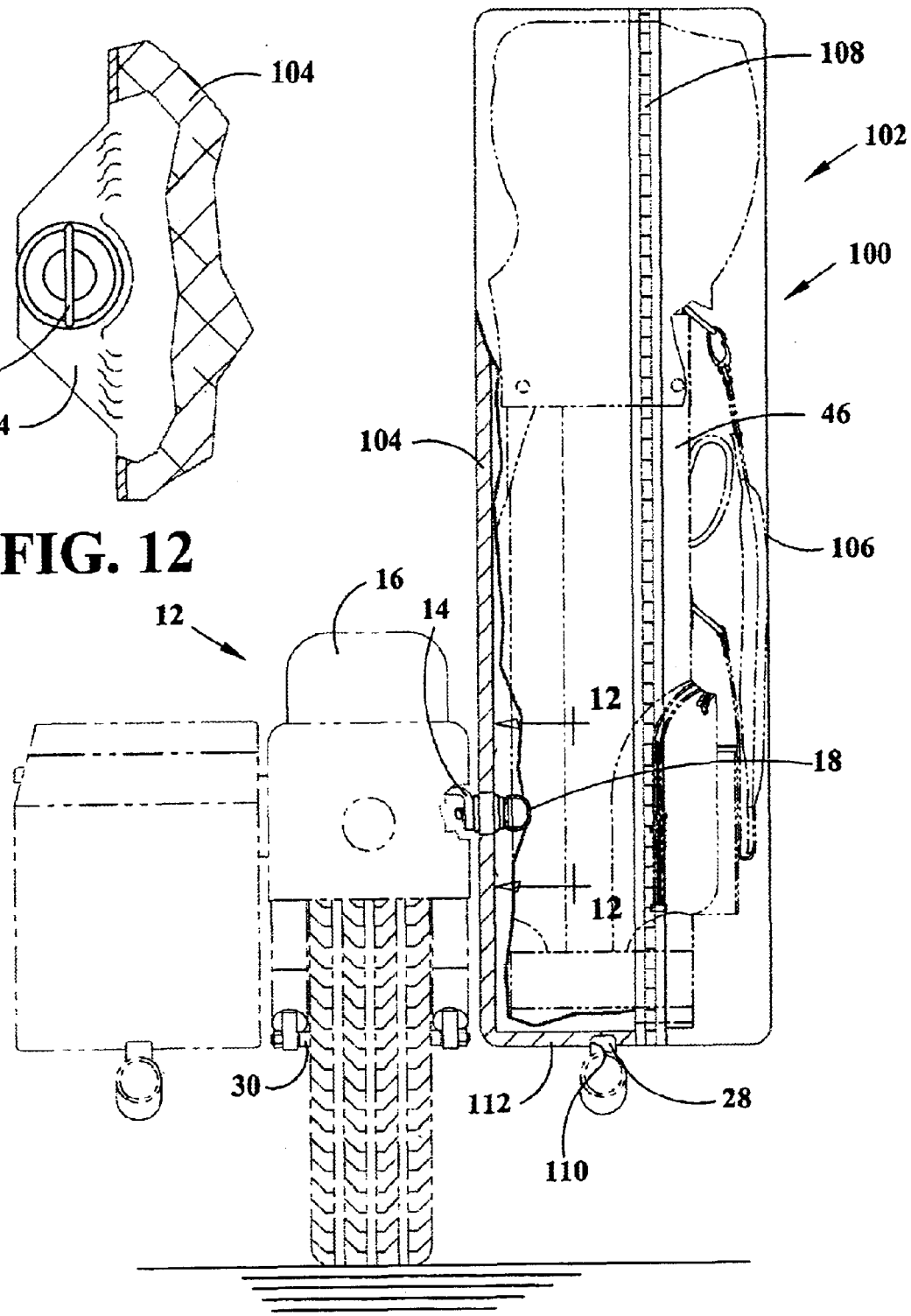
FIG. 11 is a view similar to FIG. 2 showing an alternative embodiment of the invention in which a golf bag travel case is carried by a motorcycle.

Referring now to FIGS. 11 and 12, another alternative embodiment of the invention is indicated by the reference numeral 100. The embodiment 100 is intended to secure a conventional golf bag 46 to the motorcycle 12. A travel case 102 made of a hard, relatively rigid material such as aluminum, fiberglass, ABS, and the like includes a first section 104 and a cover 106 connected to the first section 104 by a piano hinge 108. The travel case 102 can be made tamper-proof if a lock (not shown) is provided for the cover 106. In a manner similar to the previously described embodiments, a channel 110 is formed in the bottom wall 112 of the first section 104. The channel 110 is approximately the same size and shape as the rail 28 and is intended to be mounted thereon.

As best seen in FIG. 12, the first section 104 includes a pair of laterally extending tabs 114 that have openings formed therein. Locking pins 18 are inserted through the aligned openings in the brackets 14 and the tabs 114 so as to connect the first section 104 to the brackets 14 and thereby secure the travel case 102 with the bag 46 therein to the motorcycle 12.

Although the invention has been described in its preferred form with a certain degree of particularity, it will be understood that the present disclosure of the preferred embodiment has been made only by way of example, and that various changes may be resorted to without departing from the true spirit and scope of the invention. For example, and not by way of limitation, it is possible for the golf bags 46, 52, 82 to be inclined forwardly or rearwardly (rather than being supported vertically) by appropriate reconfiguration of the bracket 32, the travel case 102, and so forth. Also, although the tabs 114 are illustrated as being located outside the first section 104, it is possible to locate them on the inside of the first section 104 in order to provide tamper-proof protection for the bag 46 and the travel case 102. It is intended that the patent shall cover, by suitable expression in the appended claims, whatever degree of patentable novelty exists in the invention disclosed.

What is claimed is:

1. A motorcycle golf bag carrier adapted for connection to a motorcycle having a saddlebag mounting system that includes (a) a pair of brackets spaced from each other longitudinally of the motorcycle at approximately the same vertical elevation, each bracket having an opening, (b) a locking pin that extends through the opening in each bracket, and (c) an elongate, longitudinally extending rail disposed at a vertical elevation lower than the brackets, comprising:

a generally L-shaped bracket having a first, laterally extending section and a second, vertically extending section, the first section including a longitudinally extending channel of a size and shape that approximates the size and shape of the longitudinally extending rail and which permits the bracket to be mounted to the rail, and the second section having a pair of spaced openings of a size and shape to receive the pins, the openings being aligned with the openings in the brackets when the channel is mounted to the rail; and a first, elongate retainer member connected to one side of the second section and adapted to encircle a golf bag disposed on the first section.

2. The carrier of claim 1, wherein the first section has a vertically extending lip extending about its periphery within which the bottom of the golf bag can be nested.

3. The carrier of claim 1, wherein the first section has an upper surface and a lower surface, and wherein the channel is defined by spaced shoulders secured to the lower surface.

4. The carrier of claim 1, wherein the first retainer member is selected from the group consisting of bungee cords and straps having connectors at their ends.

5. The carrier of claim 1, wherein the second section includes an upper portion that extends to a vertical elevation above the seat of the motorcycle and further comprising a second, elongate retainer member connected to one side of the upper portion and adapted to encircle a golf bag disposed on the first section.

6. The carrier of claim 5, wherein the second retainer member is selected from the group consisting of bungee cords and straps having connectors at their ends.

7. The carrier of claim 1, further comprising a pair of hinged arms connected to the second section that can be pivoted to extend on either side of the golf bag, and wherein the elongate retainer member is connected to the arms, the elongate retainer member encircling the golf bag.

8. The carrier of claim 7, wherein the elongate retainer member is selected from the group consisting of bungee cords and straps having connectors at their ends.

9. A motorcycle golf bag carrier system for connecting a golf bag to a motorcycle having a saddlebag mounting system that includes (a) a pair of brackets spaced from each other longitudinally of the motorcycle at approximately the same vertical elevation, each bracket having an opening, (b) a locking pin that extends through the opening in each bracket, and (c) an elongate, longitudinally extending rail disposed at a vertical elevation lower than the brackets, comprising:

a bottom wall in the golf bag having a longitudinally extending channel of a size and shape that approximates the size and shape of the longitudinally extending rail and which permits the bottom wall to be mounted to the rail;

a plate member for connection to the brackets, the plate member extending above the level of the motorcycle seat and having a pair of spaced openings of a size and shape to receive the pins; and an elongate retainer member connected to one side of the plate member and adapted to encircle a golf bag whose channel is disposed on the rail.

10. The system of claim 9, wherein the retainer member is selected from the group consisting of bungee cords and straps having connectors at their ends.

11. The carrier of claim 9, further comprising a pair of hinged arms connected to the upper portion and that can be pivoted to extend on either side of the golf bag, and an elongate retainer member connected to the arms, the retainer member encircling the golf bag.

12. The carrier of claim 11, wherein the elongate retainer member is selected from the group consisting of bungee cords and straps having connectors at their ends.

13. A golf bag adapted for connection to a motorcycle having a saddlebag mounting system that includes (a) a pair of brackets spaced from each other longitudinally of the motorcycle at approximately the same vertical elevation, each bracket having an opening, (b) a locking pin that extends through the opening in each bracket, and (c) an elongate, longitudinally extending rail disposed at a vertical elevation lower than the brackets, comprising:

a bottom wall having a longitudinally extending channel of a size and shape that approximates the size and shape of the longitudinally extending rail and which permits the bottom wall to be mounted to the rail; and a side wall having a plate member included as a part thereof, the plate member having a pair of spaced openings of a size and shape to receive the pins, the openings being aligned with the openings in the brackets when the channel is mounted to the rail.

14. A golf bag travel case adapted for connection to a motorcycle having a saddlebag mounting system that includes (a) a pair of brackets spaced from each other longitudinally of the motorcycle at approximately the same vertical elevation, each bracket having an opening, (b) a locking pin that extends through the opening in each bracket, and (c) an elongate, longitudinally extending rail disposed at a vertical elevation lower than the brackets, comprising:

a bottom wall having a longitudinally extending channel of a size and shape that approximates the size and shape of the longitudinally extending rail and which permits the bottom wall to be mounted to the rail; and a side wall having a pair of spaced openings of a size and shape to receive the pins, the openings being aligned with the openings in the brackets when the channel is mounted to the rail.

15. The golf bag travel case of claim 14, wherein the case is made of a rigid material such as aluminum, fiberglass or ABS.

* * * * *